Patented June 20, 1950

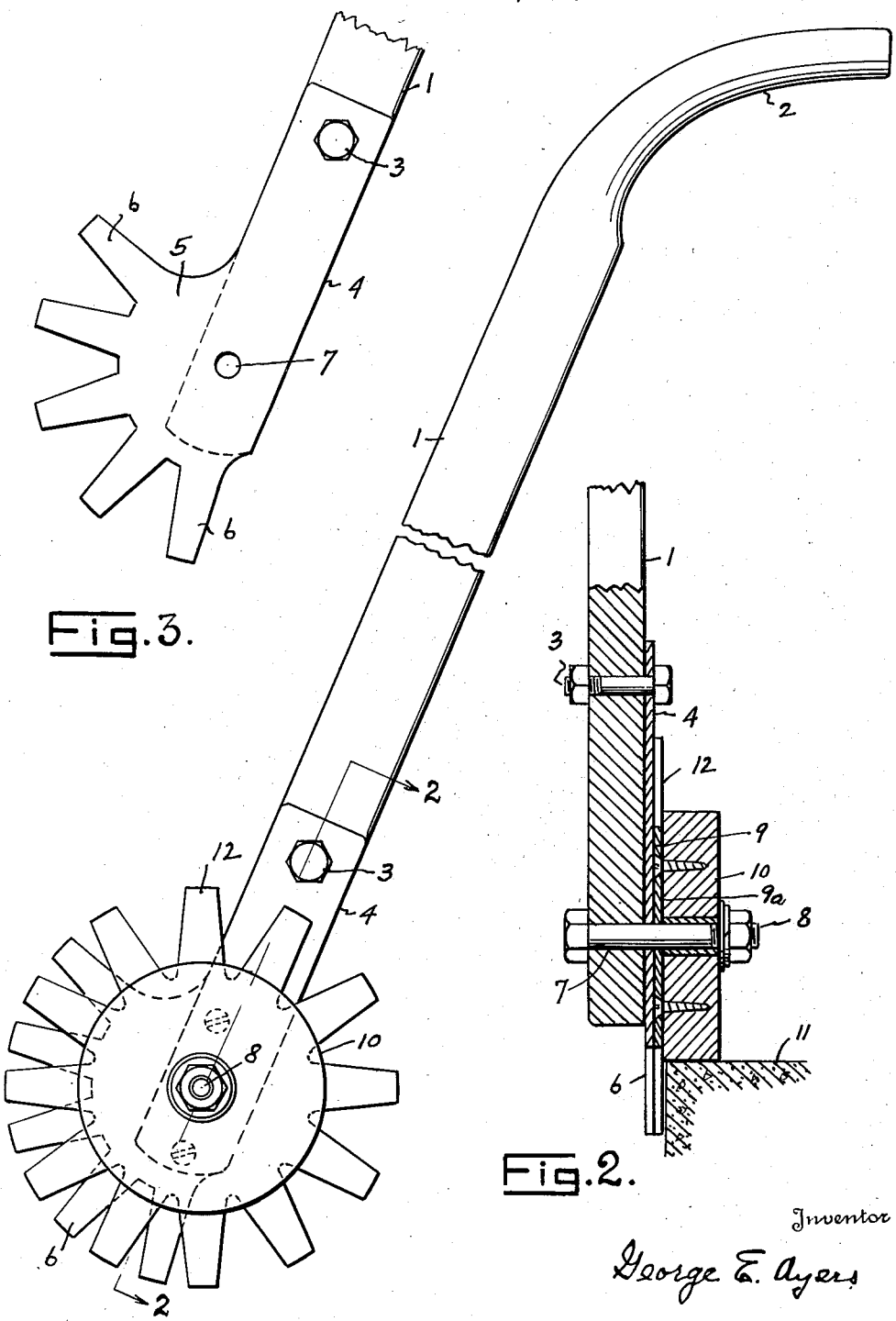

2,512,132

UNITED STATES PATENT OFFICE 2,512,132

LAWN TRIMMER

George E. Ayers, Houston, Tex.; Lydia M. Ayers, executrix of said George E. Ayers, deceased Application June 11, 1945, Serial No. 598,680

4 Claims. (Cl. 56—256)

This invention relates to a lawn trimmer.

An object of the invention is to provide an implement of the character described especially designed for trimming, or edging, lawns alongside the sidewalk or walkway.

Another object of the invention is to provide a lawn trimmer embodying a handle having a grip member at one end and a fixed plate secured to the other end of the handle, said plate terminating in an approximately semi-circular segment having radial blades with blunt ends and with the lower blade in approximate alignment with the handle, with a rotatable metallic disc mounted on a spindle and adjacent the fixed plate, said disc having radiating cutter blades whose outer ends are blunt said disc blades being of approximately the same length as the blades of said plate and a ground wheel secured to said disc adapted to travel along the walkway, or sidewalk, to impart rotation to the disc.

A feature of the invention resides in the positioning of the fixed blades of said plate so that when the handle is at one inclination the lower of said fixed blades may be caused to move between the walkway and the turf; or the handle may be lowered so as to bring said lower fixed blade to the turf level so that it will not engage with the turf while the implement is being operated.

The respective fixed end rotatable blades have cooperating cutting edges so that the tufts of grass, and the like, will be smoothly sheared off.

With the above and other objects in view the invention has particular relation to certain novel features of construction, operation and arrangement of parts, an example of which is given in this specification and illustrated in the accompanying drawings, wherein—

Figure 1 is a side view of the implement.

Figure 2 is a sectional view taken on the line 2—2 of Figure 1; and

Figure 3 is a side view with the disc and ground wheel removed.

Referring now more particularly to the drawings wherein like numerals of reference designate the same parts in each of the figures, the numeral 1 designates the handle having the grip member 2 at one end thereof.

Secured to the other end of the handle by the bolt 3 there is a fixed plate 4. At its forward end this plate is widened upwardly forming an approximately semi-circular segment 5 which is provided with the radial blades 6 whose outer ends are preferably blunt. This wide segment 5 provides a wide bearing face for the disc-assembly later referred to. The lower blade 6 is in substantial alignment with the handle.

The handle and plate 4 are provided with aligned openings 7 to receive the bolt 8.

One end of this bolt is extended to receive the disc assembly. This assembly comprises the metal disc 9 which is maintained closely adjacent the segment 5 of the metal plate 4 and secured to the outer side 9a of which there is a ground wheel 10 formed of wood or other suitable material.

The bolt 8 is extended through the disc assembly and maintained in place by a head on one end and a nut on the other end. The disc assembly is rotatable as the ground wheel moves along the walkway 11. The disc 9 has the radiating blades 12 similar to the blades 6 and of approximately the same length and whose outer ends are blunt.

These co-operating blades, or cutters, 6 and 12 have co-operating cutting edges. The tufts of grass, and the like, overhanging the walkway will be engaged between these co-operating blades, or cutters, and the lawn edge will be trimmed smooth and even.

With the handle elevated the lower fixed blade or cutter 6 may be made to travel along between the sidewalk or walkway and the turf, as shown in Figure 2, but if the ground is hard and offers considerable resistance the outer end of the handle may be lowered so as to elevate the lower cutter, or blade 6, so that it will clear, or substantially clear, the ground so as to offer less resistance to the operation of the implement but in either case the co-operating cutter blades will engage and shear off the overhanging grass or the like.

The drawings and description are illustrative merely while the broad principle of the invention is defined by the appended claims.

What I claim is:

1. A trimmer for edging lawns comprising, a handle, a grip at one end of the handle, a metallic plate secured to one side of the other end of the handle and having an approximately semi-circular segment extending upwardly from the handle and presenting a wide bearing face, radiating blades on the segment, a metallic disc mounted to rotate in contact said face and having radiating blades which co-operate with the segment blades and a ground wheel fixed to the outer side of the disc.

2. A trimmer for edging lawns comprising a handle having a grip at one end, a metal plate secured to one side of the other end of the handle, said plate being widened upwardly forming a bearing face and having radiating blades the lower one of which is in approximate alignment with the handle, a metal disc rotatably mounted in contact with said face and having radiating blades which co-operate with the plate blades, the blades of said plates and the blades of said disc being of approximately the same length, and a ground wheel fixed to the disc.

3. A trimmer for edging lawns comprising a handle, a metal plate secured to the end of the handle, at one side, said plate having an approximately semi-circular segment having a side bearing face and provided with marginal, radiating blades whose outer ends are blunt and the lower one of which is in approximate alignment with the handle, a metal disc rotatably mounted on the handle in contact with said face and having marginal, radiating blades of approximately the same length as the blades of said plate and whose outer ends are blunt and a ground wheel concentric with and fixed to said disc.

4. A trimmer for edging lawns comprising a handle, a metal plate secured to the end of the handle, at one side, said plate having an approximately semi-circular segment having a side bearing face and provided with marginal, radiating blades whose outer ends are blunt and the lower one of which is in approximate alignment with the handle, a metal disc rotatably mounted on the handle in contact with said face and having marginal, radiating blades of approximately the same length as the blades of said plate and whose outer ends are blunt and a ground wheel concentric with and fixed to said disc, the blades of the disc projecting out radially beyond said ground wheel.

GEORGE E. AYERS.

REFERENCES CITED

The following references are of record in the file of this patent:

UNITED STATES PATENTS

| Number | Name | Date |
|---|---|---|
| 1,901,992 | Smith | Mar. 21, 1933 |
| 1,970,827 | Van Kesteren | Aug. 21, 1934 |
| 2,212,057 | Waller | Aug. 20, 1940 |

FOREIGN PATENTS

| Number | Country | Date |
|---|---|---|
| 123,949 | Great Britain | Mar. 13, 1919 |